Figure 1:
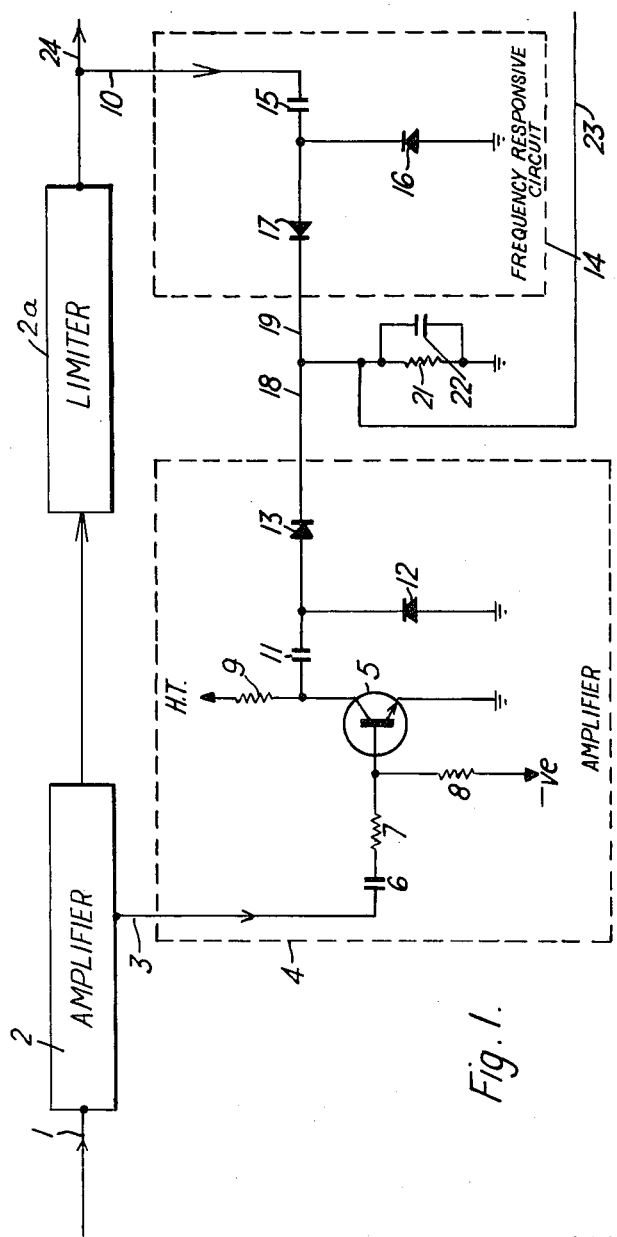

Inventors
WILLIAM L. GARFIELD
IAN F. H. GOULT

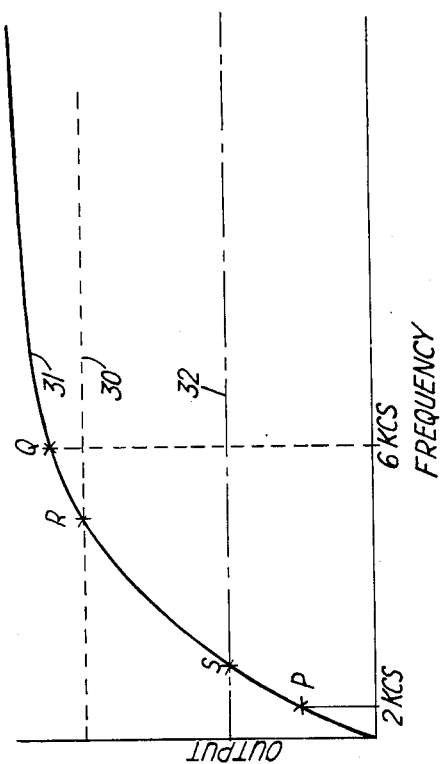

3,226,715
MONITORING CIRCUIT FOR AN F.M.
RADAR RECEIVER
William Littery Garfield and Ian Frederick Howard Goult, London, England, assignors to International Standard Electric Corporation, New York, N.Y., a corporation of Delaware
Filed Aug. 22, 1962, Ser. No. 218,687
Claims priority, application Great Britain, Sept. 8, 1961, 32,346/61
5 Claims. (Cl. 343—14)

This invention relates to a monitoring circuit for a radio receiver designed to give an indication of the presence of spurious signals, and to a method of operation of such a circuit.

The invention has particular application in radio altimeters, although it is not limited in its application thereto.

Radio altimeters, and particularly those used in the direct automatic control of an aircraft, require monitoring circuits which can identify abnormal conditions and operate alarm circuits and visual indicators when such conditions are detected.

One of the conditions under which F.M. altimeters can give erroneous height readings is that in which unavoidable spurious signals inherent in the system take control outside the normal working range of the altimeter.

In any F.M. radar system there is a leakage of spurious signals directly between the transmitting and receiving aerials, and it is a requirement of a good system that this signal should be kept as low as possible. Nevertheless, it cannot be completely eliminated and therefore, in the case of an altimeter, there must be an altitude above which this cross-coupled signal exceeds the ground return signal, and captures the counters, thus giving a very low reading. Of course, this occurs well above the normal operating range, but if the cross-coupled signal capture is complete, the altimeter cannot tell that the condition is spurious, and there is insufficient noise to operate a noise detector circuit whose chief function is to guard against fault conditions within the altimeter working range.

Typically on a low range altimeter (0–500 ft.), if the set is left switched on as the aircraft ascends, cross-coupled capture becomes complete at 7000 ft., and the alarm circuit or visual indicator known as a flag reads "good," although the height indication is zero.

This is manifestly an undesirable condition, and, in fact is intolerable for certain auto-control applications.

The present application discloses a sensing circuit which will determine whether a signal at cross-coupled signal frequency is a spurious signal or a genuine ground return signal.

This it is able to do on an amplitude basis by examining the signal level at a point in the amplifier before limiting takes place. At such a point there is typically a 20 db difference between the cross-coupled signal level, and a ground return signal of similar frequency.

At higher altitudes, this ratio is reduced to an unsafe level for amplitude discrimination, and therefore the particular circuit described in the present application discounts all amplitude measurements at frequencies more than about 3 times the cross-coupled signal frequency.

According to one aspect of the present invention there is provided a monitoring circuit for radio receiver which includes means to monitor the amplitude of a received signal, means to monitor the frequency of a received signal, and means to provide a signal when both the amplitude and frequencies of the received signals have fallen below certain values.

According to another aspect of the invention there is provided a monitoring circuit including means to generate first and second D.C. signals dependent on the amplitude and frequency respectively of a received signal, means to feed the D.C. signals with the same polarity to a common load, and means to indicate when the D.C. voltage across the common load falls below a certain value.

According to a further aspect of the invention there is provided a monitoring circuit including a first circuit for deriving a signal related to the amplitude of a received signal, a second circuit for deriving a signal related to the frequency of the received signal, and a warning indicator circuit coupled to the first and the second circuits in such manner that the warning indication is given when both the derived signals fall below certain respective values.

According to yet another aspect of the invention there is provided a method of measuring the distance of an object from a radio station including the steps of radiating an F.M. signal from a transmitter at the station, beating a portion of the transmitter output with the F.M. signal reradiated from the object, and measuring the frequency of the beat signal so produced to provide an indication of the distance of the object, deriving a D.C. signal indicative of the amplitude of the reradiated F.M. signal, deriving a D.C. signal indicative of the frequency of the beat signal, feeding the D.C. signals in the same polarity to a common load, and providing a warning indication that when the combined D.C. voltage across the common load drops below a certain value that a spurious signal is received.

An embodiment of the present invention will now be described with reference to the accompanying drawings which show in FIG. 1 a schematic circuit diagram of part of a monitoring circuit for use with an altimeter receiver, and in FIG. 2 frequency response characteristics of circuits shown in FIG. 1.

Referring to FIG. 1 there is shown an input 1 to an amplifier 2 in a F.M. radio altimeter receiver. The amplifier 2 includes a limiting circuit 2a and before the limiting circuit a connection 3 is made from the amplifier 2 to a back biased amplifier shown within the dotted rectangle 4. This back biased amplifier includes a transistor 5 having an input circuit consisting of capacitor 6, resistor 7 and resistor 8, and a negative bias supply applied via resistor 8. The output circuit of the transistor includes resistor 9, capacitor 11, and rectifiers 12 and 13. High voltage current is supplied to the transistor via resistor 9. The output of the biased back amplifier 4 is therefore a positive D.C. voltage.

An amplitude limited signal from limiter 2a is applied via lead 10 to a frequency responsive circuit contained within the rectangle 14. This circuit includes capacitor 15 and rectifiers 16 and 17. The output of the frequency responsive circuit is a positive D.C. voltage.

The outputs from the back biased amplifier and the frequency responsive circuit 14 are fed via leads 18 and 19 respectively to a common load consisting of resistor 21 and capacitor 22.

The output from the load is applied via lead 23 to a visual alarm indicator (not shown) known as a flag.

An output from limiter 2a is also applied via lead 24 to counters and a signal quality monitoring circuit such as that described in a co-pending patent application Serial No. 208,777, filed July 10, 1962, now Patent No. 3,149,243 in order to give indications of other spurious signals.

Referring to FIG. 2 there is shown a graph in which the abscissa represents frequency and the ordinate represents output, and in which the response characteristic of the back biased amplifier circuit is shown at 30, and the response characteristic of the frequency responsive circuit is shown at 31.

The dotted line 32 represents the level below which the output from the common load operatess the visual alarm indicator.

The circuit operates in the following manner:

The bias on the back biased amplifier is arranged at such a level that cross-coupled signals received by the receiver directly from the transmitter will not be amplified by the amplifier.

When the output from the frequency responsive circuit shown within dotted lines 14 is small, because the frequency of the received signal is low, and there is an output from the amplifier within dotted lines 4, the combined output from the common load is above the level of dotted line 32.

This condition is one which arises in a radio altimeter when the aircraft is near the ground since the signal returned from ground will be strong but of low frequency.

In this condition the indicator will not provide any warning indication.

When the output from the circuit 14 becomes large enough to exceed the level 32, because the frequency of the received signal becomes higher, the output from the back biased amplifier has no control since the combined output from the common load will always be such as to cause the indicator to indicate that the signal is good.

This condition prevails for most of the working range of an aircraft radio altimeter.

When however the output from the counter circuit begins to fall in amplitude because reflected signals from the ground are lost, and only the lower frequency cross-coupled signals are received by the circuit 14 then the output of the circuit 14 will drop through points Q, R, and S until, when the cross-coupled signal has completely captured the counters the output will approach point P.

This condition is usually met within a radio altimeter when an aircraft exceeds a particular height.

In this situation the amplitude of the crosss-coupled signals is too small to pass the back biased amplifier and since the combined signal from the common load will not reach level 32 the visual indicator will indicate a warning that the signal received is not reliable.

The monitoring circuit described herein is part of a comprehensive alarm indicator system in a radio altimeter which includes in addition circuits to monitor the quality of the signal and the limiting of the amplifier drive and to produce alarm indications.

This is necessary in order to cover the region of altitude between the normal altimeter working range and the point where crosss-coupled signal capture takes place. In this region the monitoring of the signal quality is effective because the ground return signals have high frequency components which are as effective as noise in operating the signal quality monitoring circuit.

An altimeter is only one particular form of distance measuring equipment, and the invention is applicable to receivers for horizontal as well as for vertical, distance measuring.

It is to be understood that the foregoing description of specific examples of this invention is not to be considered as a limitation on its scope.

What we claim is:

1. A monitoring circut for an F.M. radar system having means to transmit signals, means to receive reflected signals and means to derive a beat signal by mixing the received signals with a locally generated signal, comprising means to derive from said beat signal first and second D.C. signals dependent on the amplitude and frequency respectively of said beat signal, means to feed the D.C. signals with the same polarity to a common load, and means to indicate when the combined D.C. voltage across the common load falls below a certain value.

2. A monitoring circuit according to claim 1 wherein said amplitude dependent signal is derived from a first circuit which does not respond to a received signal of below a certain amplitude.

3. A monitoring circuit according to claim 2 wherein the first circuit is a back biased amplifier giving a rectified output.

4. A monitoring circuit according to claim 1 wherein a warning indication is given when the combined D.C. voltage across the common load falls below a certain value.

5. A monitoring circuit according to claim 4 wherein said F.M. radar system is a radio altimeter.

References Cited by the Examiner

UNITED STATES PATENTS 2,533,898 12/1950 Robinson _____ 343—17.7
3,131,386 4/1964 Spencer et al. _____ 343—17.7

CHESTER L. JUSTUS, *Primary Examiner.*